(12) United States Patent
Benedix et al.

(10) Patent No.: US 10,443,734 B2
(45) Date of Patent: Oct. 15, 2019

(54) SEAL FOR SEALING A VALVE SHAFT, TOOL AND METHOD FOR MOUNTING A SEAL TO A GUIDE ELEMENT OF A VALVE SHAFT

(71) Applicant: Aktiebolaget SKF, Gothenburg (SE)

(72) Inventors: Helmut Benedix, Leichlingen-Witzfeld (DE); Christoph Eck, Bergisch-Gladbach (DE); Maria Orth, Leichlingen (DE); Christoph Passow, Leichlingen (DE); Willy Seewald, Remscheid (DE)

(73) Assignee: Aktiebolaget SKF, Göteborg (SE)

( * ) Notice: Subject to any disclaimer, the term of this patent is extended or adjusted under 35 U.S.C. 154(b) by 34 days.

(21) Appl. No.: 15/159,793

(22) Filed: May 19, 2016

(65) Prior Publication Data

US 2016/0341315 A1 Nov. 24, 2016

(30) Foreign Application Priority Data

May 22, 2015 (DE) .................. 10 2015 209 427

(51) Int. Cl.
| | |
|---|---|
| *F16J 15/3232* | (2016.01) |
| *F16J 15/3252* | (2016.01) |
| *F01L 3/08* | (2006.01) |
| *F16J 15/3268* | (2016.01) |
| *F01L 13/06* | (2006.01) |
| *F16K 41/08* | (2006.01) |

(52) U.S. Cl.
CPC ............. *F16J 15/3232* (2013.01); *F01L 3/08* (2013.01); *F01L 13/06* (2013.01); *F16J 15/3252* (2013.01); *F16J 15/3268* (2013.01); *F16K 41/08* (2013.01); *F01L 2101/00* (2013.01); *F01L 2820/01* (2013.01)

(58) Field of Classification Search
CPC .. F16J 15/3232; F16J 15/3252; F16J 15/3268; F16J 15/3236; F16J 15/3256; F01L 3/08; F01L 13/06; F01L 2101/00; F01L 2820/01; F16K 41/08
USPC ....................................... 277/502
See application file for complete search history.

(56) References Cited

U.S. PATENT DOCUMENTS

| | | | |
|---|---|---|---|
| 4,507,837 A | 4/1985 | Hinkle | |
| 6,123,054 A * | 9/2000 | Netzer ............... | F16J 15/3212 123/188.6 |

(Continued)

FOREIGN PATENT DOCUMENTS

| | | |
|---|---|---|
| CN | 1620358 A | 5/2005 |
| CN | 101973013 A | 2/2011 |

(Continued)

*Primary Examiner* — Nathan Cumar
(74) *Attorney, Agent, or Firm* — Bryan Peckjian; SKF USA Inc. Patent Dept.

(57) ABSTRACT

Embodiments relate to a seal for sealing a valve shaft in an internal combustion engine. The seal includes a sealing lip of an elastomer which is configured to be in contact with a shell surface of the valve shaft perpendicular to a radial direction. The seal further includes a supporting structure firmly connected to the sealing lip and made of a material different from the elastomer of the sealing lip which is configured to create a form-fit in the axial direction directly between the supporting structure and a guide element of the valve shaft by an at least partial plastic deformation in the radial direction.

5 Claims, 6 Drawing Sheets

(56) References Cited

U.S. PATENT DOCUMENTS

| | | | |
|---|---|---|---|
| 6,209,504 B1* | 4/2001 | Hegemier | F01L 3/08 |
| | | | 123/188.6 |
| 2002/0179877 A1* | 12/2002 | Leimer | F16K 5/188 |
| | | | 251/174 |
| 2004/0020022 A1 | 2/2004 | Bates | |
| 2006/0108792 A1* | 5/2006 | Takasaki | B21D 11/14 |
| | | | 285/131.1 |
| 2006/0278840 A1* | 12/2006 | Leimer | F01L 3/08 |
| | | | 251/214 |
| 2013/0200574 A1* | 8/2013 | Hegemier | F01L 3/08 |
| | | | 277/502 |

FOREIGN PATENT DOCUMENTS

| | | |
|---|---|---|
| CN | 103244984 A | 8/2013 |
| EP | 1338762 B1 | 8/2003 |
| EP | 2236867 A1 | 10/2010 |
| WO | 2013009479 A1 | 1/2013 |

\* cited by examiner

SEAL FOR SEALING A VALVE SHAFT, TOOL AND METHOD FOR MOUNTING A SEAL TO A GUIDE ELEMENT OF A VALVE SHAFT

Present embodiments are located in the field of seals for sealing a valve shaft, tools and methods for mounting a seal to a guide element of a valve shaft.

In the technical field of internal combustion engines usually valves are used which regulate an inlet of fresh gas or an outlet of exhaust gas and are provided with a valve shaft seal (VDR) for sealing a combustion chamber of the internal combustion engine. For some types of internal combustion engines, like for example modern truck motors, valve shaft seals may be required which have to withstand pressures of several bar in an engine brake operation. In this respect, the seals may comprise a gas lip which is oriented towards or facing the air side and a reinforced rubber bead for a secure hold on the guide. The guide may in many cases comprise a trapezoidal undercut into which the rubber bead engages. Such a positioning may become problematic, however, with higher pressures, for example from 15 bar upward, as here the seal may move off the guide. Apart from that, the rubber material per se may tear so that possibly no higher forces may be transmitted any more. Likewise, the rubber material may embrittle over time, for example by the influence of temperature or media, and consequently its holding force may be affected negatively.

According to a conventional concept, a metal piece comprises an undercut. This type of construction may also be operated with an increased pressure as the rubber seal is clamped in the assembled state. Also here the rubber material may tear but not evade. However, the metal piece may cause higher costs.

EP1338762B1 describes a valve shaft seal which statically seals in axial direction on a guide. A hold on the guide is realized by a spring-loaded metal piece. The metal piece is not cylindrical on its outside but is configured polygonally by three bevels and consequently shows a spring behavior. The diameter of the seat on the guide is here only slightly larger than the inner circle of the polygon. Thus, a clamping force is generated without rubber. This solution, however, may possibly only hardly or not at all hold the mentioned compressive forces from 15 bar.

It may further also be possible that such pressures also occur in other construction types of combustion engines. All in all, such pressures may also occur with other types of machines than those mentioned above. Thus, a reinforced sealing of a pressure chamber may be desirable in several fields of technology.

It is thus the object to provide an improved concept for sealing a valve shaft with an internal combustion engine.

This object is solved by a seal for sealing a valve shaft, a tool and a method for mounting a seal to a guide element of a valve shaft according to the independent claims.

According to a first object, embodiments relate to a seal for sealing a valve shaft in case of an internal combustion engine. The seal includes a sealing lip of elastomer which is configured to be in contact with a shell surface of the valve shaft perpendicular to a radial direction. The seal further includes a supporting structure of a material which is different from the elastomer of the sealing lip and is firmly connected to the sealing lip. The supporting structure is configured to provide a form fit in the axial direction by at least a partial plastic deformation in the radial direction, directly between the supporting structure and a guide element of the valve shaft. A form fit is again caused by a form-fitting connection and may partially or completely prevent a shifting of two components with respect to each other due to geometrical implementations of the components. Thus, by means of the sealing lip by sealing at the guide element a sealing of a volume may be caused which may possibly withstand an increased pressure.

In some embodiments, the material of the supporting structure is a metallic material. This may, for example, be pure metal or an alloy of metals like e.g. steel. This way, a deformation may at least partially take place plastically and cause an improved holding force.

In some embodiments, the seal further includes a further sealing lip which is configured and arranged to be in contact with the guide element. This may enable to generate a sealing connection to the guide element, wherein possibly an amount of elastomer material may be saved. Alternatively or additionally it may also be possible to reduce a number of components.

In some embodiments, the guide element comprises a contact surface which is oriented perpendicular to a surface normal tilted with respect to the radial direction and is configured in order to be in contact with the further sealing lip. This may possibly cause in improved utilization of a contact pressure of the further sealing lip onto the guide element.

In some embodiments the seal is further configured to exert an axially directed contact pressure or an axially directed component of a contact pressure onto the contact surface after creating the form fit between the supporting structure and the guide element of the valve shaft. In other words, this way a seal effect may be created while simultaneously improving the hold of the seal.

In some embodiments, the guide element comprises a contact surface which is oriented perpendicular to a radially extending surface normal in order to be in contact with the further sealing lip. This may be more simple and appropriate with respect to a manufacturing process.

In some embodiments, the contact surface is an installation chamfer of the guide element. The same may, for example, be configured in the form of a truncated cone. It may thus be possible to configure the contact surface such that the same may be used for several purposes (assembly aid and sealing surface).

In some embodiments, the supporting structure comprises a basically cylindrical body comprising a section basically arranged or configured rectangularly at one end. This way, a contact pressure of the further sealing lip with respect to the guide element and thus a sealing effect may be increased. The rectangular section may, for example, be flanged.

In some embodiments, the rectangularly arranged or configured section of the supporting structure is at least partially or completely enclosed by the elastomer of the sealing lip.

In some embodiments, the elastomer of the sealing lip is bonded to the supporting structure substance to substance (stoffschlüssig), for example vulcanized. It may thus be possible to improve a seat of the sealing lip on the supporting structure and possibly prevent shifting.

In some embodiments, after creating the form fit (Formschluss) between the supporting structure and the guide element of the valve shaft, the elastomer of the sealing lip does not overtop the guide element in axial direction. In other words, in the axial direction the elastomer is flush with the guide element. By this, possibly elastomer may be saved.

In some embodiments, the seal further includes the guide element. The guide element comprises a plurality of radial recesses or radial indentations arranged along a circumferential direction. Here, after creating the form fit between the supporting structure and the guide element, the supporting structure engages into the radial recesses or the radial indentations of the guide element to create an at least partial form-fit connection between the supporting structure and the guide element. "At least partial" here may mean, for example, that a form-fit in the axial direction and a frictional connection (Kraftschluss) or substance-to-substance connection exists in radial direction or that in axial direction a form-fit and a frictional connection are effective. This may cause an improved seat of the seal on the guide element and possibly render the use of cost and time consuming special designs of the seal or the guide element unnecessary.

Some embodiments relate to a valve of an internal combustion engine. The valve includes a seal for sealing a valve shaft of the valve. Here, the valve at least partially closes a volume which includes a fitting joint between the guide element and the valve shaft. The valve is configured to seal at least temporarily during operation with a pressure of at least 15 bar in the volume. An improved seat of the seal may here also be possible in operational states which stress the seal more intensely. In other embodiments, the pressure may also be at least 20 bar.

According to a further aspect, embodiments relate to a tool for mounting a seal to a guide element of a valve shaft. The tool includes a top or attachment component comprising at least one radially movable power transmission element and which is configured to receive the seal. The tool further includes a fixation component which is configured to exert a radial force onto the at least one power transmission element such that the power transmission element causes at least a partial plastic deformation of a supporting structure of the seal in the radial direction such that by the deformation a form-fit in the axial direction directly between the supporting structure and the guide element of the valve shaft is created. This way, a method for mounting the seal may possibly be substantially facilitated.

In some embodiments, the fixation component is shiftable in axial direction with respect to the top component. The fixation component comprises a feeder which is tapered along the axial direction and faces the power transmission element, so that by shifting the fixation component in the axial direction, a shifting of the power transmission element in the radial direction is caused. A number of assembly steps may thus possibly be reduced.

In some embodiments, the power transmission element and the fixation component each comprise a higher degree of hardness than the supporting structure of the seal. This may enable a more pronounced deformation and thus possibly an improved hold of the seal or also reduce wear of the tool.

In some embodiments, the power transmission element is one of a plurality of power transmission elements arranged in equidistant intervals along a periphery of the top component lying in a radial plane. This way it may be possible to equally distribute a force acting upon the seal across the perimeter.

In some embodiments, the power transmission element is configured ball-shaped. A possible canting of the power transmission element during assembly may thus possibly be prevented.

According to still a further aspect, embodiments relate to a method for mounting a seal to a guide element of a valve shaft. The method includes putting the seal on top of the guide element. The method further includes creating a form-fit in the axial direction directly between a supporting structure and the guide element by an at least partial plastic deformation of the supporting structure of the seal in radial direction. Thus, a seal may be created which offers an improved seat also in case of increased pressure. Cost and time consuming constructions or special designs of the VDR may possibly be omitted, whereby manufacturing expenditure or costs may be saved. It may further be possible to thus decrease a consumption of elastomer for the seal.

Further advantageous implementations are explained in more detail in the following with respect to the embodiments illustrated in the Figures which the embodiments are not restricted to, however. What is shown in detail.

In the following description of the attached drawings, like reference numerals relate to like or similar components. Further, summarizing reference numerals are used for components and objects which occur several times in one embodiment or in one illustration, but are described in common with reference to one or several features. Components or objects designated by like or summarizing reference numerals may be implemented alike, possibly, however also differently with respect to individual, several or all features, for example their dimensioning, as far as nothing else explicitly or implicitly results from the description.

Figure 1A:
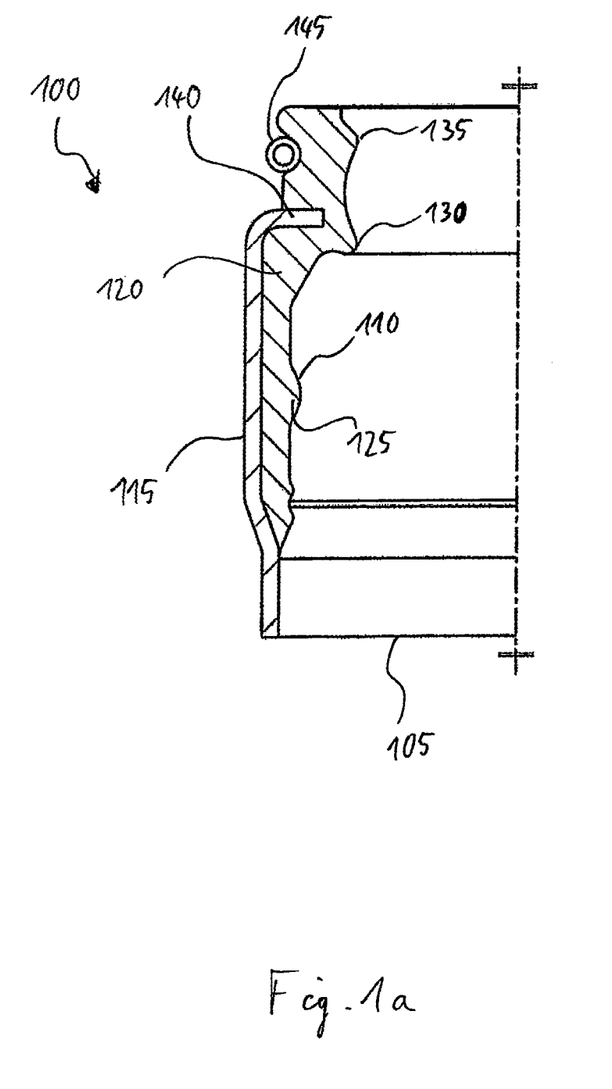
FIG. 1a, b cross-sectional views of valve shaft seals according to two comparative examples.
Figure 1B:
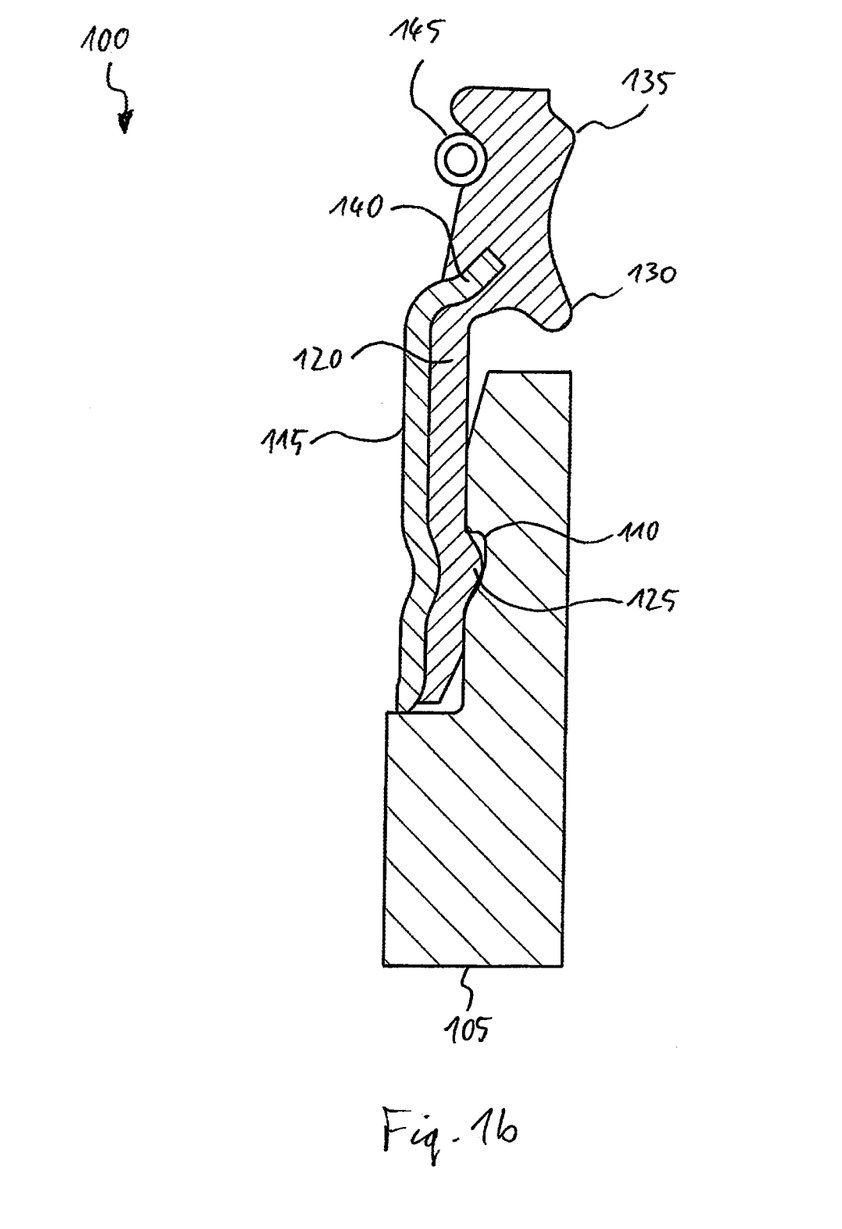

FIGS. 1a and b show comparative examples of a valve shaft seal 100 for a combustion engine. A dash-dotted line here marks an axial direction along which a valve shaft may be shifted with respect to the valve shaft seal 100. The valve shaft seal 100 is mounted to a guide 105. The guide 105 comprises an undercut 110 which circulates along a circumference of the guide 105. The valve shaft seal 100 includes a folded sheet 115 which partially radially encloses a sealing material 120 of the valve shaft seal 100. The sealing material 120 further comprises a feeder 125 which is radially directed inward which engages into the undercut 110 after an assembly of the valve shaft seal 100. This way, the sealing material 120 may be clamped to the guide 105. A gas lip 130 and an oil lip 135 here each seal a gas space and an oil space at the valve shaft. The folded sheet 115 further comprises a radial feeder 140 which may serve for reinforcing the gas lip 130. Further, a contact pressure onto the valve shaft may be reinforced by a tension spring 145. With high pressures, for example of at least 15 bar, the folded sheet 115 may possibly prevent the sealing material 120 from giving way, there may, however, be a danger of the sealing material 120 tearing and a consequent lifting off of the valve shaft seal 100 from the guide 105. Additionally a manufacturing of the guide 105 may cause increased costs.

Figure 2A:
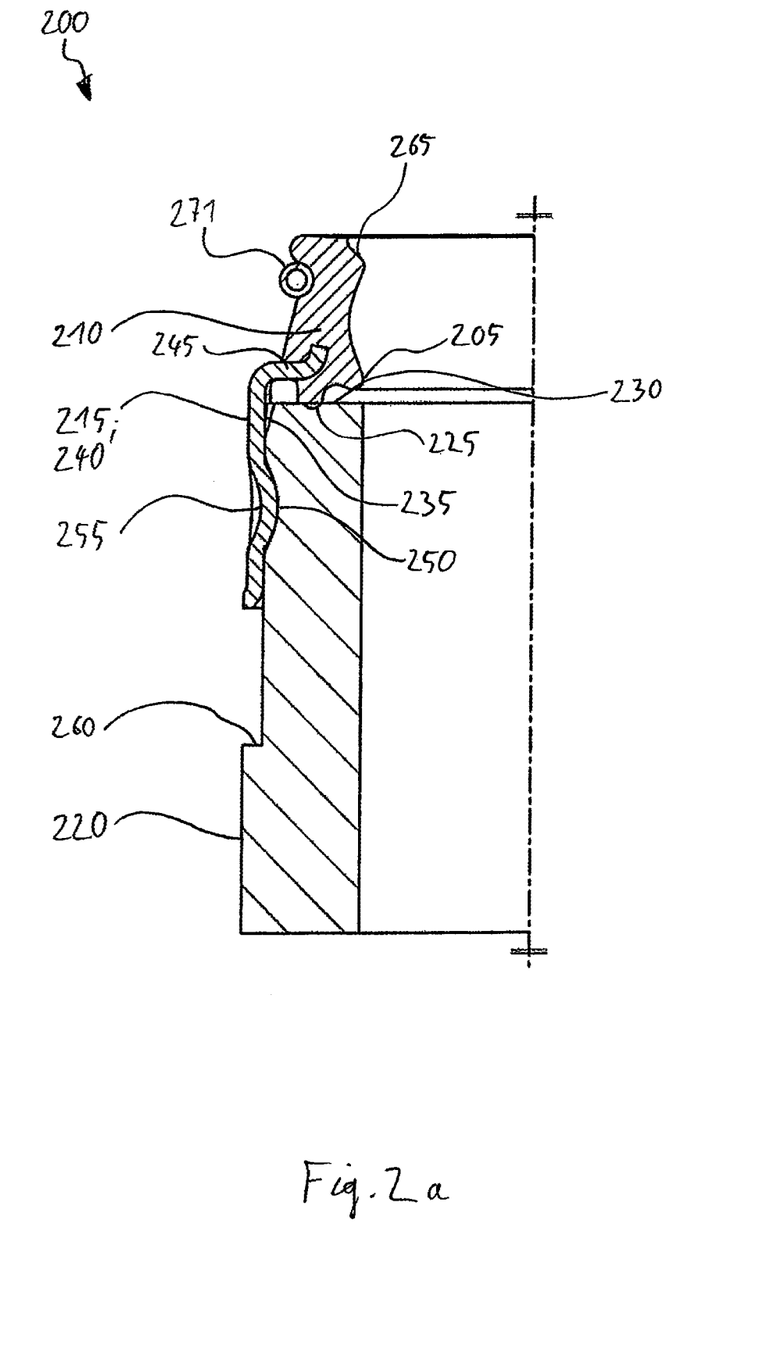
FIG. 2a a cross-sectional view of a seal according to one embodiment.
Figure 2B:
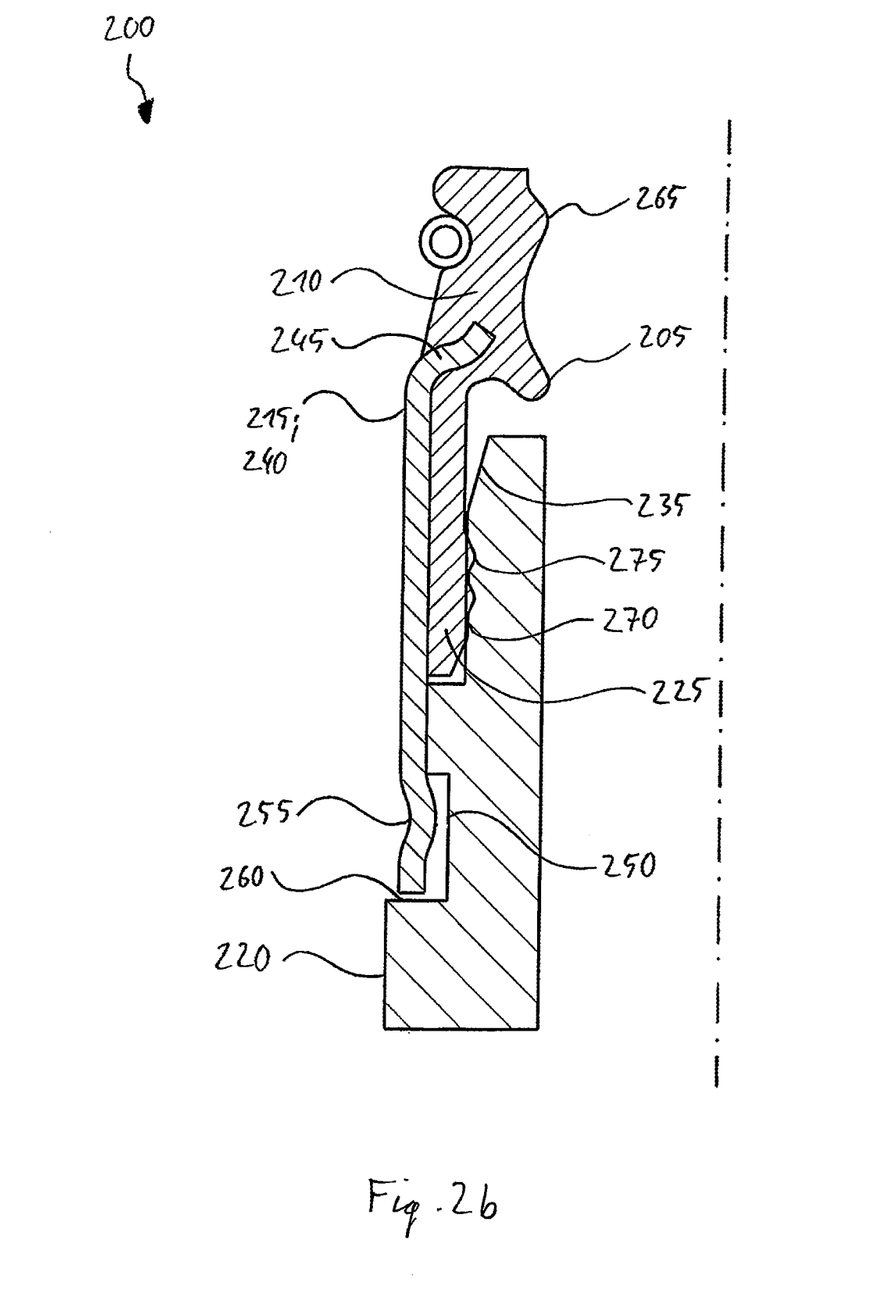
FIG. 2b a cross-sectional view of a seal radially sealing at the guide according to one embodiment.

Embodiments thus propose an improved concept for sealing a valve shaft which possibly also withstands higher pressures, e.g. in a range from 15-20 bar, and thus may maintain a sealing effect. FIGS. 2a and b show a seal 200 for sealing a valve shaft in an internal combustion engine according to one embodiment. Again, a dash-dotted line marks a central axis extending in the axial direction along which the valve shaft may be shifted with respect to the seal 200. The central axis may here further form an axis of symmetry of the valve shaft, the seal 200 or a guide element 220. Further, a radial direction is perpendicular to the axial direction. The seal 200 includes a sealing lip 205 of an elastomer 210 which is configured to be in contact with a shell surface of the valve shaft which is perpendicular to a radial direction. The seal 200 further includes a supporting structure 215 firmly connected to the sealing lip 205 and made of a material which is different from the elastomer 210 of the sealing lip 205. The supporting structure 215 is configured to create, by at least a partial plastic deformation in the radial direction, a form-fit in the axial direction directly between the supporting structure 215 and the guide element 220 of the valve shaft. Thus, by means of the sealing lip 205, by sealing at the guide element 220, a sealing of a volume may be caused which may withstand an increased pressure.

The term "adjacent" relates to two objects between which no further object of the same type is arranged. Corresponding objects are "Directly" adjacent if they abut each other, i.e., for example, are in contact with each other.

As it may be seen from FIGS. 2a and b, the sealing lip 205 is a radially extending sealing lip 205 which, after creating the form-fit between the supporting structure 215 and the guide element 220 of the valve shaft, seals at the valve shaft. The elastomer 210 may, for example, comprise fluorinated rubber (FKM), nitrile-butadiene rubber (NBR) or hydrous acrylonitrile butadiene rubber (HNBR).

In some embodiments, the material of the supporting structure 215 is a metallic material. The same may, for example, be steel or, in other words, a metal alloy which mainly comprises iron and apart from that possible optional components like, e.g., carbon, nickel, chromium etc. Apart from that, also other metals or metal alloys may be used. One material of the guide element 220 may also be a metallic material. It may thus be possible to create a form-fit between two directly adjacent metallic components (the supporting structure 215 and the guide element 220) wherein also in case of a load caused by pressure acting upon the seal 200 a possibility of deformation may be reduced.

During an operation of the internal combustion engine, a relative movement of the valve shaft with respect to the guide element 220 may be facilitated along the axial direction. The valve shaft is here located radially within the guide element 220. The valve shaft and the guide element 220 here bound a fitting joint in the radial direction which may, e.g., comprise an extension in a range from 1 to 100 μm, for example 10 μm, in this direction.

The seal 200 further includes a further sealing lip 225 which is configured and arranged to be in contact at the guide element 220. The further sealing lip 225 may also be manufactured from an elastomer, in particular also from the same elastomer 210 as the sealing lip 205. Due to the fact that the further sealing lip 225 is in contact with the guide element 220, a sealing function may be caused when the seal 200 is mounted to the guide element 220 (and/or after creating the form-fit between the same). The guide element 220 further comprises a contact surface 230 in FIG. 2a which is oriented perpendicular to a surface normal which is tilted with respect to the radial direction. In other words, the contact surface 230 at least partially extends in the radial direction. In FIG. 2a, the contact surface 230 is even located in a radial plane whose surface normal is formed by the central axis. The supporting surface 230 is further implemented to be in contact with the further sealing lip 225. In some embodiments the seal 200 is configured, after creating the form-fit between the supporting structure 215 and the guide element 220 of the valve shaft, to exert a radially directed contact pressure onto the contact surface 230. This way, a sealing effect may be caused which may only be canceled under difficulty due to the form-fit even when increasing the pressure in a volume which includes the fitting joint. The volume including the fitting joint is also designated as a gas space and a volume facing away from the gas space seen from the perspective of the seal 200 is designated as an oil space.

In contrast to FIG. 2a, the guide element 220 in FIG. 2b comprises a contact surface 270 which is oriented perpendicular to a radially extending surface normal. In other words, the contact surface 270 at least partially extends in the axial direction. The contact surface 270 is further configured to be in contact with the further sealing lip 225. In this embodiment, the seal 200 is implemented, after creating the form-fit between the supporting structure 215 and the guide element 220 of the valve shaft, to exert a radially directed contact pressure onto the contact surface 270. The contact surface 270 further comprises a wave-shaped profiling 275. This way, possibly a frictional force may be reduced in an assembly process or a sealing effect may be increased as the radially directed contact pressure may be concentrated onto the contact points between the profiling 275 and the further sealing lip 225.

In some of the above-mentioned embodiments, the contact surface 230 is an installation chamfer 235 of the guide element 220. Alternatively, the further sealing lip 225 may accordingly seal at the installation chamfer 235. The installation chamfer 235 is arranged such that applying or shifting of a supporting element 240—which comprises the supporting structure 215—onto the guide element 220 may be facilitated. By the installation chamfer 235, for example, at one end of the guide element 220 to which the seal 200 is to be attached, a shape of a truncated cone or a cone may be created which is located at a side of the guide element 220 positioned radially outwards. This way, attaching or shifting the supporting element 240 may be facilitated by reducing the possibility of canting.

In some embodiments, the supporting structure 215 is configured such that the same comprises a substantially cylindrical body having a section 245 configured or arranged substantially rectangularly at one end. "Substantially" may here, for example, mean "within the scope of manufacturing tolerances" or "with a deviation of at most 5%, 10% or 20% (with respect to an angle or an axial ratio)". Consequently, for example, the angle in FIG. 2b deviates from a right angle. The section 245 may, for example, be created by flanging. Flanging here, for example, is a process of shaping in sheet metal processing. It may have a form-stabilizing effect on the further sealing lip 225 or cause an increase of the contact pressure of the further sealing lip 225 onto the contact surface 230. Here, the rectangular section 245 of the supporting structure 215 may at least partially be enclosed by the elastomer 210 of the sealing lip 205 or the further sealing lip 225. In FIG. 2, the sealing lip 205 and the further sealing lip 225 are, for example, integrally formed from a common elastomer. In some embodiments, the elastomer 210 is connected substance-to-substance to the supporting structure 215, for example by vulcanizing.

In some of the embodiments in which the supporting surface 230 only extends in the radial direction or, in other words, is perpendicular to the axial direction, after creating the form-fit, the guide element 220 is not towered by the elastomer 210 of the sealing lip 205 in the axial direction. In other words, the elastomer 210 may terminate flush with the guide element 220. The contact pressure of the further sealing lip 225 may here possibly be better utilized. Alternatively, the elastomer 210 of the sealing lip 205 may tower the guide element 220 in the axial direction, for example when the contact surface 230 corresponds to the installation chamfer 235. Here, a shell surface of the cone shape of the installation chamfer 235 may include the contact surface 230. The contact surface 230 may thus also be used as an aid for an assembly the seal 200 onto the guide element 220.

The guide element 220 may be included by the seal 200. Further, in FIGS. 2a and b, the guide element 220 includes a plurality of radial recesses, projections or indentations 250 arranged along a circumferential direction. The indentations 250 may, for example, be configured dome-shaped (spherical or ellipsoid) or parabolically or comprise a rectangular cross-section as in FIG. 2b. The supporting structure 215 here, after creating the form-fit between the supporting structure 215 and the guide element 220, engages into the radial recesses, projections or indentations 250 of the guide element 220. Thus, at least a partially form-fit connection between the supporting structure 215 and the guide element 220 is created. In this respect, the supporting structure 215 comprises a dent 255 extending radially inwards which engages into the indentations 250 of the guide element 220. In the case of indentations 250 with a rectangular cross-section illustrated in FIG. 2b, even after the assembly of the supporting structure 215 onto the guide element 220 optionally a play or intermediate space may remain between the dents 255 and the indentations 250. The engagement of the dents 255 into the indentations 250 may cause a protection of the seal 200 from accidentally slipping off of the guide element in case of an increased pressure may be increased. It may additionally be enabled here (in contrast e.g. to one single indentation radially circulating in the form of a groove) to prevent a twisting of the seal 200 on the guide element around the central axis by the form fit.

Further, the guide element 220 in FIGS. 2a and b comprises an offset 260 or an edge extending radially outward. Their radial extension may correspond to a radial extension of the supporting element 240 such that the guide element 220 terminates radially flush to the supporting element 250 at a side of the offset 260 facing away from the supporting element 240. This may possibly enable an improved utilization of space. Apart from that, the seal 200 may comprise an additional sealing lip 265 which forms a gliding and sealing contact to the valve shaft. In case of such an arrangement, the sealing lip 205 may seal a gas space and the sealing lip 265 may seal an oil space at the valve shaft. For increasing a contact pressure of the additional sealing lip 265, the same may be circulated by a tension spring 271 at a radial exterior side. The additional sealing lip 265 may be manufactured from the same elastomer 210 as the sealing lip 205 and the further sealing lip 225. In the illustrated embodiment, the sealing lip 205 is facing the gas space in the axial direction and the additional sealing lip 205 is facing the oil space in the axial direction which additionally may make the escape of gas from the gas space or oil from the oil space difficult. The gas space may here be located in an inlet or outlet tract of the internal combustion engine.

The seal 200 may be included in a valve of an internal combustion engine. The valve may here at least partially enclose the volume which includes the fitting joint between the valve shaft and the guide element 220 (gas space). The gas space may here temporarily comprise a pressure of at least 15 bar. Some further embodiments additionally include the internal combustion engine with the above-mentioned valve. The internal combustion engine may, for example, be mounted in a truck or another vehicle. For example, when used in a truck, states of operation may occur wherein pressures of up to 20 bar or even more may be acquired. Such a state of operation is, e.g., an engine brake operation.

Figure 3A:
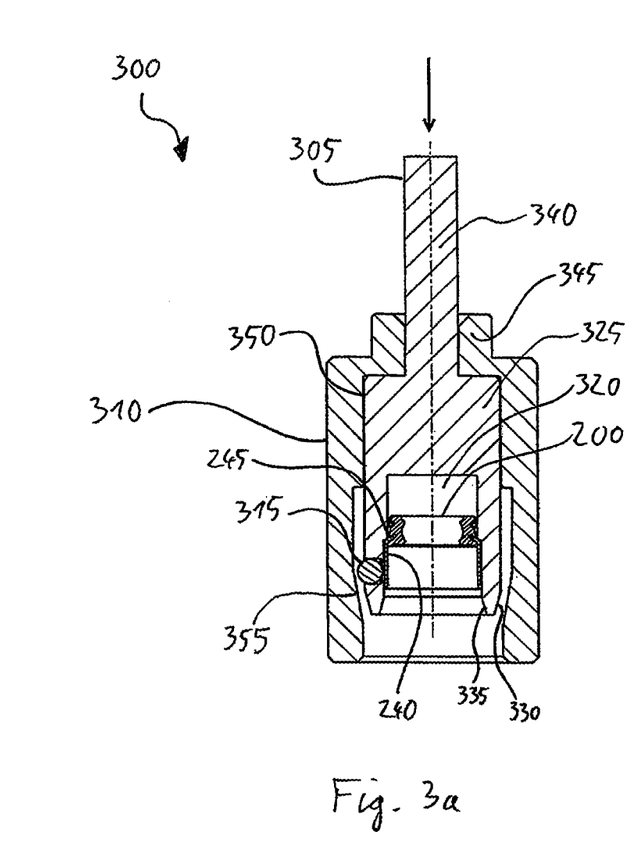
FIG. 3a, b cross-sectional views of a tool for mounting a seal according to one embodiment in different assembly steps each.
Figure 3B:
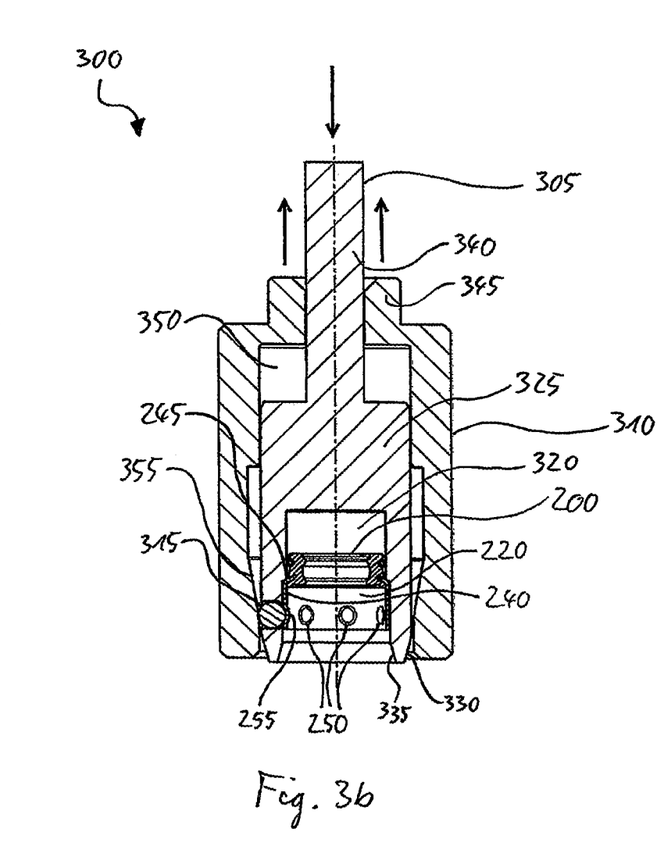

FIGS. 3a and 3b illustrate cross-sectional views of a tool 300 for mounting the seal 200 of FIG. 2a or b onto a guide element of a valve shaft. Components of the seal 200 which correspond to those in FIG. 2a or b are not explained again in FIGS. 3a and 3b for reasons of simplicity; rather, only the differences are discussed.

The tool 300 includes a top component 305 and a fixation component 310. The top component 305 is implemented to receive the seal 200 and comprises a radially movable power transmission element 315. The power transmission element 315 is here, for example, implemented as a sphere 315. The top component 305 includes a substantially cylindrical cavity 320 which completely or at least partially receives the seal 200. The cylindrical cavity 320 is located in a substantially cylindrically implemented mounting section 325 of the top component 305. In other words, the form of the mounting section 325 at least partially corresponds to a half open hollow cylinder oriented along the axial direction. An open side of the hollow cylinder is here provided with an outer chamfer 330 and an inner chamfer 335. When using the tool 301 the outer chamfer 330 may cant with the fixation component 310 and, when using the seal 200, the inner chamfer 335 may possibly prevent canting with the seal 200. In addition to the mounting section 325, the top component 305 comprises a guide section 340 which follows a closed side of the hollow cylinder of the mounting section 325.

The fixation component 310 is configured, by means of the guide section 340 along an axial direction which is marked as a dash-dotted line, to be shifted with respect to the top component 305. The fixation component 310 here includes a fitting 345 which serves for guiding the guide section 340, and a cavity 350 which is configured to receive the mounting section 325 of the top component 305. In embodiments, the fixation component 310 is configured to exert a radial force onto the sphere 315 so that the sphere causes at least a partial plastic deformation of a supporting structure 215 of the seal 200 in the radial direction. Here, by the deformation a form-fit is created in the axial direction directly between the supporting structure 215 and the guide element 220 of the valve shaft.

In some embodiments, the fixation component 310 in this respect comprises a feeder 355 tapered radially along the axial direction and facing the sphere 315, so that by shifting the fixation component 310 in the axial direction a shifting of the sphere 315 in the radial direction towards the central axis is caused. In FIGS. 3a and 3b, the feeder 355 comprises a chamfered surface which corresponds to a shell surface of a truncated cone and is tapered towards an open side of the cavity 350. In a different embodiment, the tapering may also be directed towards a closed side of the cavity 350 and the fixation component 310, when shifting into an opposite axial direction, may correspondingly cause a shifting of the sphere 315 towards the central axis.

The supporting element 240 first of all comprises a basically cylindrical section which passes in parallel to the central axis from the rectangular section 245 up to an end facing away from the rectangular section 245. By shifting the sphere 315 towards the central axis the supporting element 240 is caused to be at least partially plastically deformed. FIG. 3a shows an assembly step of the seal 200, wherein the seal 200 is inserted into the top component 305 but not yet put on top of the guide element 220. An arrow marks the direction of placement. FIG. 3b shows an assembly step of the seal 200 wherein the seal 200 is placed on top of the guide element 220 and by axially shifting the fixation component 310 with respect to the top component 305 (illustrated by opposing arrows), a shifting of the sphere 315 and thus the at least partial plastic deformation of the supporting element 240 are caused. By the deformation the dents 255 directed radially towards the central axis are formed which engage into the indentations 250 of the guide element 220.

The seal 200 may be adapted to the tool 300 for assembly. The seal 200 is thus pressed onto the guide element 220 by the tool 300 and subsequently deformed such that a form-fit connection is created and the seal 200 is thus locked to the guide element 220. In this connection, the use of an elastomer or rubber-type material between the guide element and the supporting structure 240 of the seal 200 may be omitted. The sealing lip 205 of the seal may thus be static, be pressed into the guide element 220 during assembly and thus be in axial or radial contact with the guide element 220. Also a contact of the sealing lip 205 with the installation chamfer 235 may be created. In a further assembly step the fixation component 310 may be shifted into an axially opposing direction with respect to the top component 305 and the tool 300 may be removed from the assembled seal 200.

An interior side of the cylindrical section of the supporting element 240 may be manufactured from metal only, wherein in comparison to conventional valve shaft seals a use of rubber or elastomer at the interior side may be omitted. In an as-delivered condition before assembly the cylindrical section may be virtually round or undeformed, in other words. During assembly the cylindrical section is put onto the guide element 220 such that between the supporting element 240 and the guide element 220 a loose fit exists and pressure is excerted onto the guide element 220 using a predefined force X. The predefined force X presses the (possibly static) sealing lip 205 to the guide element 220. For a form-fit, during or after pressing the seal 200 onto the guide element 220, the fixation component 310 is drawn back using the cone-shaped feeder 355, so that the feeder 355, for example, presses three or more spheres 315—which are distributed across the circumference of the seal 200—in the radial direction towards the guide element 220. These spheres may then press the supporting element 240 at least partially into a groove (which for example corresponds to the radial indentation 250) in the guide element 220. This way, at least a partially permanent deformation may result within the supporting element 240. Subsequently, the fixation component 310 may be put down and the tool 300 may be removed.

In some embodiments, the sphere 315 and the fixation component 310 comprise a higher degree of hardness than the supporting structure 240 of the seal 200. This may reduce wear of the tool 300 in case of repeated use. Additionally, this way the deformation of the supporting element 240 may be more pronounced, whereby a stronger holding force may be realized during an operation of the seal 200. The sphere 315 or the fixation component 310 may, for example, be manufactured from hardened steel. Hardening steel may cause an increase of its mechanical resistance by a specific change and conversion of its structure. This may, for example, be caused by heat treatment and subsequent quick cooling. Steel may be a metal alloy which comprises at least 50% iron.

As already mentioned, several spheres 315 may exist which are, for example, arranged at equidistant intervals along a circumference of the top component 305 in a radial plane. The angular positions of these spheres 315 may here correspond to the angular positions of the indentations 250 of the guide element 220. For example, three spheres 315 or indentations 250 may be arranged in distances of 120° each with respect to each other. This may possibly prevent that a compressive load of the seal 200 unevenly distributes on a circumference of the form-fit connection between the holding element 240 and the guide element 220.

Figure 4:
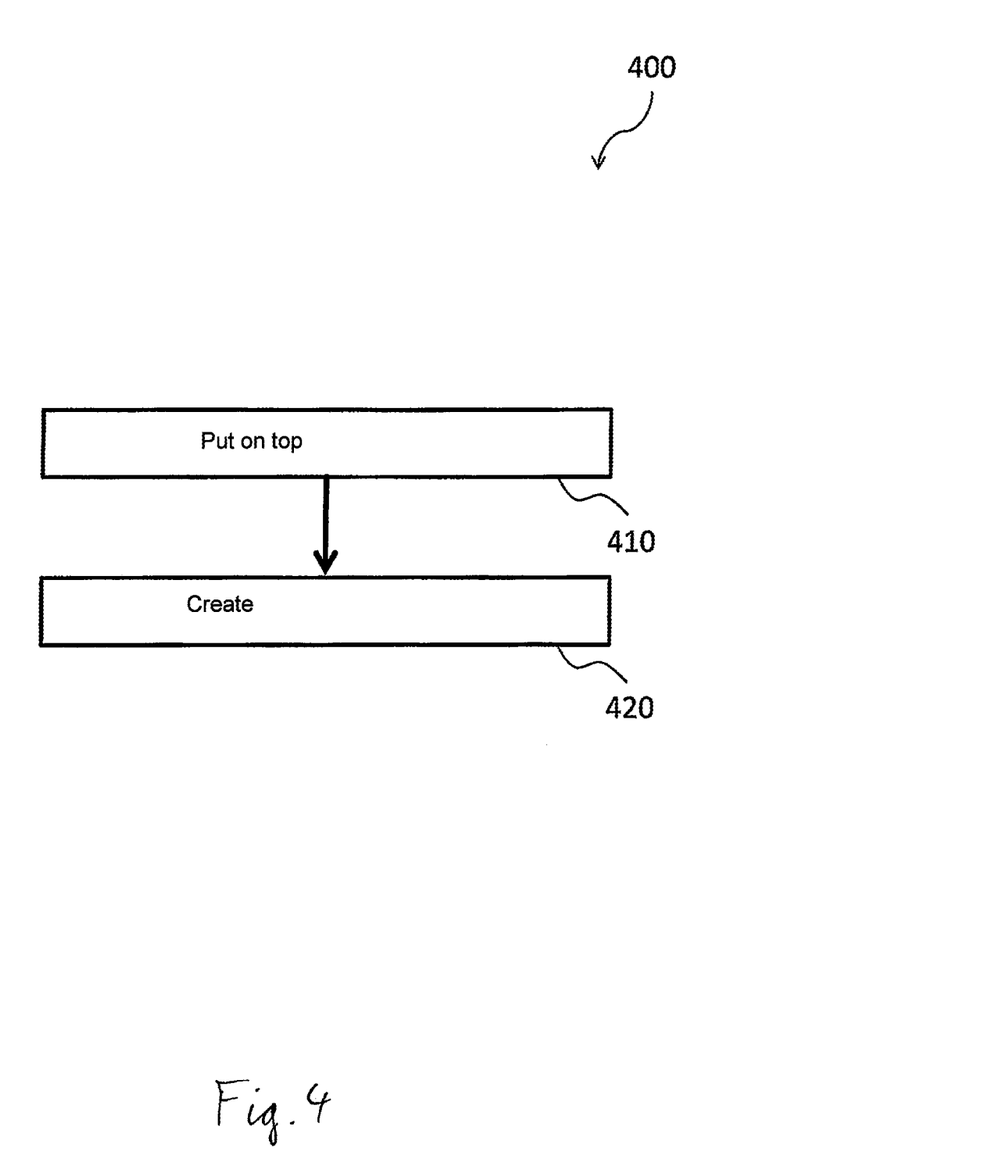
FIG. 4 a flowchart of a method for mounting a seal according to one embodiment.

FIG. 4 shows a flowchart for a method 400 for mounting a seal to a guide element of a valve shaft. The method 400 includes putting 410 the seal on top of the guide element. The method 400 additionally includes creating 420 a form-fit in the axial direction directly between a supporting structure and the guide element by an at least partial plastic deformation of the supporting structure of the seal in the radial direction. Thus, a seal may be created which offers an improved seat even with an increased pressure. Possibly complex constructions or special designs of the VDR may here be omitted, whereby manufacturing efforts or costs may be saved. In this way it may further be possible to reduce a consumption of elastomer for the seal.

By embodiments, a security of a seat of a seal on a guide of a valve shaft may be facilitated with high pressures (e.g. from 15 bar). Possibly complex special designs of the valve shaft seal may here be omitted. Further, an elastomer consumption and involved costs may possibly be reduced.

The above-described embodiments merely represent an illustration of the principles of the present invention. It is obvious that modifications and variations of the arrangements and details described herein are obvious for other persons skilled in the art. It is thus the object that the invention is merely limited by the scope of the appended patent claims and not by the specific details presented herein by the description and the explanation of the embodiments.

Features disclosed in the above description, the subsequent claims and the appended Figures may be of importance and implemented both individually and also in any combination for implementing an embodiment in its different forms.

REFERENCE NUMERALS LIST

100 Valve shaft seal
105 Guide
110 Undercut
115 Folded sheet
120 Sealing material
125 Feeder
130 Gas lip
135 Oil lip
140 Radial feeder
145 Tension spring
200 Seal
205 Sealing lip
210 Elastomer
215 Supporting structure
220 Guide element
225 Further sealing lip
230 Contact surface
235 Installation chamfer
240 Supporting element
245 Rectangularly formed section
250 Indentations
255 Dents
260 Offset
265 Additional sealing lip
270 Contact surface
271 Tension spring
275 Profiling
300 Tool
305 Top component
310 Fixation component 315 Power transmission element
320 Cylindrical cavity
325 Mounting section
330 Outer chamfer
335 Inner chamfer
340 Guiding section
345 Fit
350 Cavity
355 Feeder
400 Method
410 Putting on top
420 Creation

The invention claimed is:

1. A seal for sealing a valve shaft in an internal combustion engine, comprising:
- a sealing lip of an elastomer which is configured to be in contact with a lateral surface of the valve shaft perpendicular to a radial direction; and
- a supporting structure firmly connected to the sealing lip and made of a material which is different from the elastomer of the sealing lip which is implemented to create a form-fit in axial direction directly between the supporting structure and a guide element of the valve shaft by an at least partial plastic deformation in the radial direction,
- wherein the material of the supporting structure is a metallic material, further comprising a further sealing lip which is configured and arranged to be in contact with the guide element,
- the guide element further comprising a plurality of radial recesses or radial indentations arranged along a circumferential direction, and the supporting structure further comprising a plurality of dents extending radially inwards towards the guide element, which, after creating the form-fit directly between the supporting structure and the guide element, the dents directly engage into the radial recesses or the radial indentations of the guide element to create an at least partially form-fit connection in both axial directions directly between the supporting structure and the guide element.

2. The seal according to claim 1, which is configured to exert an axially directed contact pressure onto the contact surface after creating the form-fit between the supporting structure and the guide element of the valve shaft.

3. The seal according to claim 1, wherein the guide element comprises a contact surface oriented at least partially in the axial direction and is configured to be in contact with the further sealing lip.

4. A method for mounting a seal to a guide element of a valve shaft, comprising:
- putting the seal on top of the guide element;
- creating a form-fit in an axial direction directly between a supporting structure and the guide element by an at least partial plastic deformation of the supporting structure of the seal in a radial direction; and
- after creating the form-fit between the supporting structure and the guide element, directly engaging a plurality of dents in the supporting structure extending radially inwards towards the guide element into a plurality of radial recesses or radial indentations arranged along a circumferential direction of the guide element to create an at least partially form-fit connection in both axial directions directly between the supporting structure and the guide element.

5. The seal according to claim 1, wherein the guide element comprises a contact surface oriented at least partially in the radial direction and configured to be in contact with the further sealing lip.

* * * * *